United States Patent
Wolf et al.

(10) Patent No.: US 9,058,829 B1
(45) Date of Patent: Jun. 16, 2015

(54) MULTIPLE HEATERS INDEPENDENTLY CONTROLLING CLEARANCE OF TWO OR MORE READ TRANSDUCERS

(71) Applicant: Seagate Technology LLC, Cupertino, CA (US)

(72) Inventors: John Wolf, Maple Grove, MN (US); Erik Hutchinson, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/097,435

(22) Filed: Dec. 5, 2013

(51) Int. Cl.
*G11B 21/02* (2006.01)
*G11B 5/127* (2006.01)
*G11B 5/60* (2006.01)
*G11B 5/31* (2006.01)

(52) U.S. Cl.
CPC .............. *G11B 5/607* (2013.01); *G11B 5/6005* (2013.01); *G11B 5/6064* (2013.01); *G11B 5/60* (2013.01); *G11B 5/3133* (2013.01)

(58) Field of Classification Search
None
See application file for complete search history.

(56) References Cited

U.S. PATENT DOCUMENTS

| 5,896,249 | A | * | 4/1999 | Fontana et al. | 360/234.5 |
|---|---|---|---|---|---|
| 7,268,966 | B2 | | 9/2007 | Pit et al. | |
| 7,701,676 | B2 | * | 4/2010 | Kubotera et al. | 360/294.7 |
| 8,879,193 | B1 | * | 11/2014 | Burd | 360/64 |
| 2008/0225427 | A1 | * | 9/2008 | Liu | 360/75 |
| 2012/0300334 | A1 | * | 11/2012 | Hsiao et al. | 360/59 |

* cited by examiner

*Primary Examiner* — Andrew L Sniezek
(74) *Attorney, Agent, or Firm* — Hollingsworth Davis, LLC (57) ABSTRACT

A apparatus includes first and second read transducers arranged on a media-facing surface. The read transducers detect magnetic fields of a recording medium. First and second heaters are disposed proximate the respective first and second read transducers. The first and second heaters independently control respective first and second protrusions of the first and second read transducers from the media-facing surface.

17 Claims, 5 Drawing Sheets

MULTIPLE HEATERS INDEPENDENTLY CONTROLLING CLEARANCE OF TWO OR MORE READ TRANSDUCERS

BACKGROUND

Magnetic recording devices such as hard disk drives utilize magnetic read and write transducers that are held close to the surface of a spinning magnetic disk. The write transducer generates a varying magnetic field that causes a change in magnetic orientation of bits within tracks on the disk. The read transducer follows the tracks and generates a signal based on variations in magnetic field, and these signals are used to read the bits. For both read and write transducers, a clearance between the transducer and disk may be actively adjusted to ensure optimum performance of the transducers.

SUMMARY

The present disclosure is related to multiple heaters independently controlling clearance of two or more read transducers. In one embodiment, an apparatus includes first and second read transducers arranged on a media-facing surface. The read transducers detect magnetic fields of a recording medium. First and second heaters are disposed proximate the respective first and second read transducers. The first and second heaters independently control respective first and second protrusions of the first and second read transducers from the media-facing surface.

In another embodiment, a system includes a slider having first and second read transducers arranged on a media-facing surface of the slider. The read transducers detect magnetic fields of a recording medium. First and second heaters are disposed proximate the respective first and second read transducers. The system includes a control circuit coupled to the first and second heaters. The control circuit provides a current to the first and second heaters that independently control respective first and second clearances between the first and second read transducers and the recording medium.

In another embodiment, a method involves reading a signal from a magnetic recording medium via first and second read transducers arranged on a media-facing surface of a slider. A first clearance between the magnetic recording medium and the first read transducer is controlled via a first heater. Independently of the first clearance, a second clearance between the magnetic recording medium and the second read transducer is controlled via a second heater.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure is related to systems, methods, and apparatuses utilizing magnetic readers with multiple read sensors for reading magnetic recording media, e.g., hard disks. Generally, current hard disk devices utilize a read/write head (also referred to as a slider) with a single read transducer for reading data. Multiple read/write heads may be used, e.g., separate read/write heads positioned at top and bottom surfaces of one or more magnetic disks. New architectures are being proposed that use more than one read transducer per read/write head. These new architectures use multiple read transducers to read recording media that recorded at an increased areal density compared to current recording architectures (e.g., perpendicular recording media). These architectures may also employ multiple writers.

The theoretical maximum areal density of current magnetic recording architectures is bounded by what is known as the superparamagnetic limit. The superparamagnetic limit relates to the tendency of magnetic grains to randomly flip magnetic orientation in response to thermal fluctuations, and defines a lower bound on the area in which an individual bit can be reliably stored. In order to address the superparamagnetic limit, technologies such as heat assisted magnetic recording (HAMR) and bit patterned media (BPM) are being developed to increase areal density beyond what is current possible with perpendicular architectures.

A HAMR recording device uses an energy source such as a laser to heat a spot on a high-coercivity medium to locally reduce coercivity during recording. After the spot has cooled, the data is less susceptible to data loss due to thermal fluctuations. A BPM device has a media that is patterned via nanolithography to form magnetic cells used to store bits of data. The use of nanolithography allows for greater areal density than if the cells were defined in a continuous medium by a write transducer.

Another technique to increase storage capacity, known as shingled recording, utilizes drive architectures different from the ones in use today, but may be implemented using existing perpendicular media and conventional (e.g., non-HAMR) read-write heads. Shingled recording involves writing tracks that overlap part of previously written tracks. The write head includes features such as high field strength and sharp corner-edge field that can result in narrower tracks. While this can be achieved using existing technologies, the architecture needs to take into account potential impact on random writes that are introduced by shingled writing.

Whether areal density is increased using HAMR, BPM, or shingled writing, existing read transducers may have difficulty reading back these narrower tracks. For example, shrinking the read transducers in a cross-track direction may decrease signal-to-noise ratio. As a result, two-dimensional magnetic recording (TDMR) is proposed to facilitate reading back data from narrower tracks using a read transducer that is wider than the tracks.

Conventional magnetic recording is sometimes categorized as a one-dimensional (1-D) architecture, even though a magnetic recording surface is, in principle, a two-dimensional (2-D) system. For example, grains on a conventional media surface are not formed based on specific direction assumptions, and performance of the magnetic grains does not depend which direction is along-track and which direction is cross-track. Conventional magnetic recording systems generally constrain an inherently 2-D system to 1-D system in attempt to reduce system cost and complexity.

For example, a 1-D system utilizes individually accessed tracks, which allows for a single read head, single write head, and simplified controller functionality. As a result of this, a 1-D system attempts to minimize inter-track interference, which can increase decoding errors. In contrast, a 2-D system may be designed to assume that multiple tracks may be read at once. A 2-D system may require more sophisticated decoding, but allows relaxing some constraints on erase bands, transducer width, etc.

Even in a confirmation where read transducers are not larger than the written tracks, a multiple-read-transducer arrangement may have benefits. The use of two read transducers can increase the data rate of read operations. The signals read by adjacent tracks can also be jointly decoded to reduce the effects of cross-track interference, skew, etc. For purposes of the following discussion, multiple-read-transducer data storage devices described herein may use read transducers that are smaller than, larger than, or the same as the written data tracks. Further, the number of read transducers may be larger than two.

Figure 1:
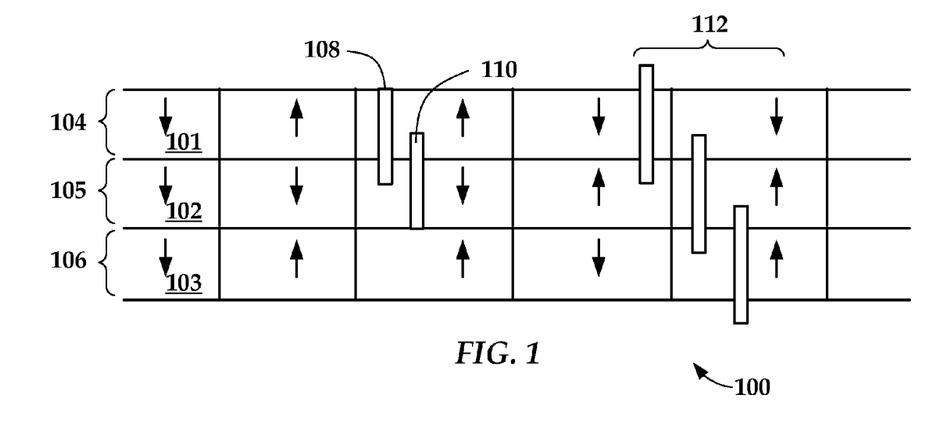
FIG. 1 is a block diagram illustrating reading of two-dimensional data tracks according to an example embodiment.

In reference now to FIG. 1, a block diagram illustrates an example of reading 2-D tracks according to an example embodiment. Bits 101-103 are shown written in respective tracks 104-106 on a magnetic media surface 100. Although the bits 101-103 are shown aligned to each other from track-to-track, this is not required. The arrows within the bits 101-103 represent magnetic orientations that will be sensed as ones or zeros by a reader, e.g., by read transducers 108 and/or 110. The read transducers 108, 110 may include magnetoresistive transducers, such as giant magnetoresistance (GMR) sensor, tunneling magnetoresistance (TMR) sensor, etc. Generally, these types of transducers include layers of magnetic and non-magnetic materials that change resistance in response to local magnetic fields. A current is passed through the sensor while the media moves underneath. The resulting signal is used to read bits on the tracks 104, 105.

The tracks 104-106 may be written by successive passes of a writer (not shown), e.g., forming shingled tracks by overlapping subsequent tracks during writing. In such a case, there may be limited erase bands between subsequent tracks 104-106. It will be understood that the embodiments described herein need not be limited to shingled tracks/media, and the concepts may be equally applicable to other track writing technologies, such as perpendicular, HAMR, and BPM.

In some embodiments, a width of the read transducers 108, 110 may be significantly wider than the tracks, such that the read transducers 108 will read signals from at least two adjacent tracks. For example, both read transducers 108 and 110 will read at least partially from both tracks 104 and 105. The signals from the read transducers 108, 110 may be processed using a two-dimensional decoding algorithm, where the individual track signals are determined from a combination of the signals from both transducers 108, 110.

A TDMR device may use other read transducer arrangements than what is shown for transducers 108, 110. For example, read transducer 110 may be shifted down so as to cover track 105 fully and track 106 partially. More than two read transducers may be used, as indicated by transducer array 112. All of the transducers in array 112 are centered over the respective tracks 104-106, and therefore overlap two adjacent tracks. In other embodiments, the read transducers may have a width that is the same as or less than a single recorded track. In some embodiments, not all of the read transducers are used to read back user data. For example, one read transducer on an outside edge could be used for thermal asperity detection. In another example, a read transducer could be dedicated to track locating, e.g., determining when the read/write head approaches the servo marks that define the tracks.

Generally, the present disclosure relates to the maintaining of a desired clearance between multiple read transducers and the recording media. In order to read data from the media, the transducers are held at a predetermined distance from the media surface without contact (or at least an attempt is made to minimize contact). Current read/write heads may roughly hold clearances through the use of air bearing features on the media-facing surface. The air bearing features cause the read/write head to be separated from the moving media via a thin layer of air. For fine adjustments, a heater or piezoelectric element can controllably deform a small portion of the read/write head near the read transducer to affect the clearance between the transducers and media.

The control of clearances can become more complicated when there are two read transducers on a single read/write head. The read transducers may be separated far apart enough that it is difficult to optimize the clearance for both heads at the same time. This may be due to, among other things, manufacturing tolerances of the read/write head, differences in surface conditions between adjacent tracks, etc. As a result, embodiments described below include more than one heater, as well as other features that facilitate independent adjustment of read transducer clearance.

Figure 2:
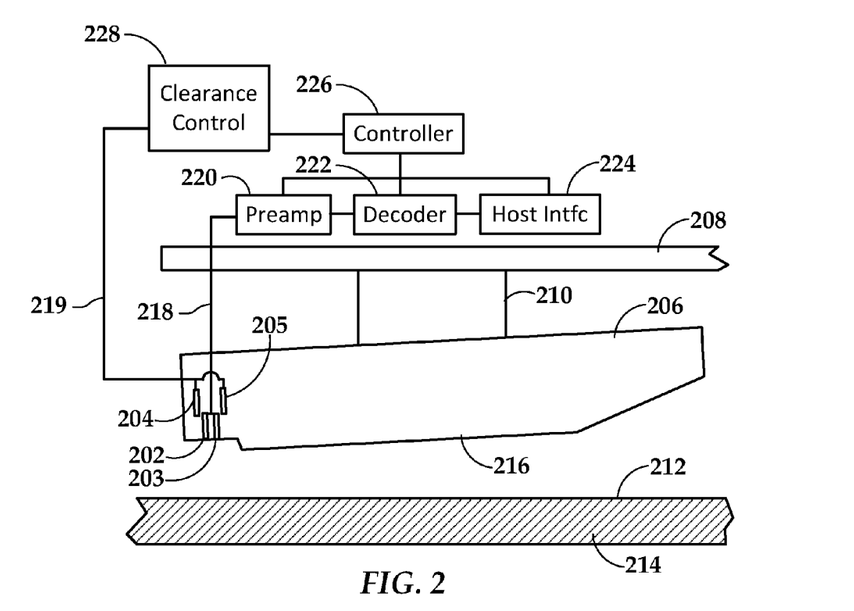
FIG. 2 is a block diagram of an apparatus according to an example embodiment.

The read transducers and media shown in FIG. 1 may be included together in a hard disk data storage device. Details of such a device according to an example embodiment are shown in FIG. 2. Generally, first and second read transducers 202, 203 are housed at a trailing edge of a slider 206, also sometimes referred to as a read/write head. The slider 206 is coupled to arm 208 by way of a suspension 210 that allows some relative motion between the slider 206 and arm 208. In addition to the read transducers 202, 203, the slider 206 may include one or more write transducers (not shown), such as a write pole and coil. When the slider 206 is located over surface 212 of a magnetic disk 214, a flying height is maintained between the slider 206 and surface 212 by a downward force of arm 208. This downward force is counterbalanced by an air cushion that exists between the surface 212 and a media-facing surface 216 of the slider 206 when the disk 214 is rotating.

Changes in local magnetic field caused by the moving disk 214 induce a change in resistance of the read transducers 202, 203. The read transducers are coupled to a preamplifier 220 by way of signal lines 218. Generally, the preamplifier 220 amplifies and conditions the analog signals (which may include a two-dimensional signal) received via signal lines 218. The preamplifier 220 may also provide bias voltages and to the read transducers to achieve a desired electrical operating point. The amplified signals received via the preamplifier 220 are used for other processing modules such as decoder 222. The decoder 222 determines a digital output from the analog signals, the digital output being used by a host via host interface 224, as well as other system components (not shown). The processing of the signals and data is generally managed by a controller 226, which may include a microprocessor and/or other logic circuits.

The slider 206 includes first and second heaters 204, 205 disposed proximate the respective first and second read transducers 202, 203. The first and second heaters 204, 205 control respective first and second protrusions of the first and second read transducers 202, 203 from the media-facing surface 216. The first and second heaters 204, 205 may be resistive and/or inductive heaters, and may operate in cooperation with other elements (not shown) that generate heat near the media facing surface 216, such as a writer heater, write pole and/or HAMR laser.

A clearance control module 228 is coupled to the first and second heaters 204, 205 to the controller 226 via control lines 219. The clearance control module 228 may include analog conditioning and control circuitry to drive and monitor the first and second heaters 204, 205. The clearance control module 228 generally receives inputs from the controller 226 to increase or decrease electrical power applied to the first and second heaters 204, 205. The controller 226 may detect current clearance via a sensor (not shown) located near the read transducers 202, 203. Such a sensor may include a thermal sensor that detects thermal trends indicative of a current clearance between the read transducers 202, 203 and the media surface 212.

The clearance control module 228 facilitates independently controlling the first and second heaters 204, 205, which in turn facilitates independently controlling clearance of the first and second read transducers 202, 203. The first and second heaters 204, 205 may be wired to the clearance control module 228 in parallel, in which case separate ones of the signal lines 219 may be dedicated to supplying a different current to respective first and second heaters 204, 205.

The first and second heaters 204, 205 may be wired to the clearance control module 228 in series, in which case independent control may be achieved through variation of an alternating current signal, which is discussed in greater detail below. For example, series connected heaters may be coupled to frequency sensitive components. In such a case, applied AC frequencies may affect each heater differently, thereby facilitating independent control by varying the applied frequency.

As shown in FIG. 1, the first and second read transducers 202, 203 may be offset from one another in a down-track direction, and may also be offset in a cross-track direction. There may be one or more writer as well. If there is one writer, it may be aligned with one of the read transducers 202, 203. In such a case, both the writer and the aligned reader may be controlled by one of the heaters 204, 205, e.g., a heater element that is elongated in the down-track direction. In other cases, the writer may not be aligned with the readers, e.g., aligned with down-track extending centerline of the slider 206, with the read transducers 202, 203 offset from this centerline. In such a case, the writer may have a separate clearance-control heater, and this writer heater may work independently from the heaters 204, 205, or operate together with one of the read heaters 204, 205 to assist in independent clearance control of one of the read transducers 202, 203.

Generally, providing two heaters 204, 205 at a minimum allows controlling individual close points near to the respective read transducers 202, 203. This not only allows for independent clearance control of each read transducer 202, 203, but can improve response speed, reduce maximum temperatures, and or reduce total heater power consumption. This is because individual heaters 204, 205 can work using smaller heated volumes compared to a heater that controls clearance for both read transducers 202, 203 together. The individual heated volumes can be made with high coefficient of thermal expansion (CTE) materials (e.g., push blocks) to assist in shaping the close point locations at lower heater power. The push blocks, together with individual heaters and other low thermal conductivity materials, can limit the amount of heat that could reach the read transducers 202, 203. Excessive heat can cause electrical instability of the read transducers 202, 203.

Figure 3:
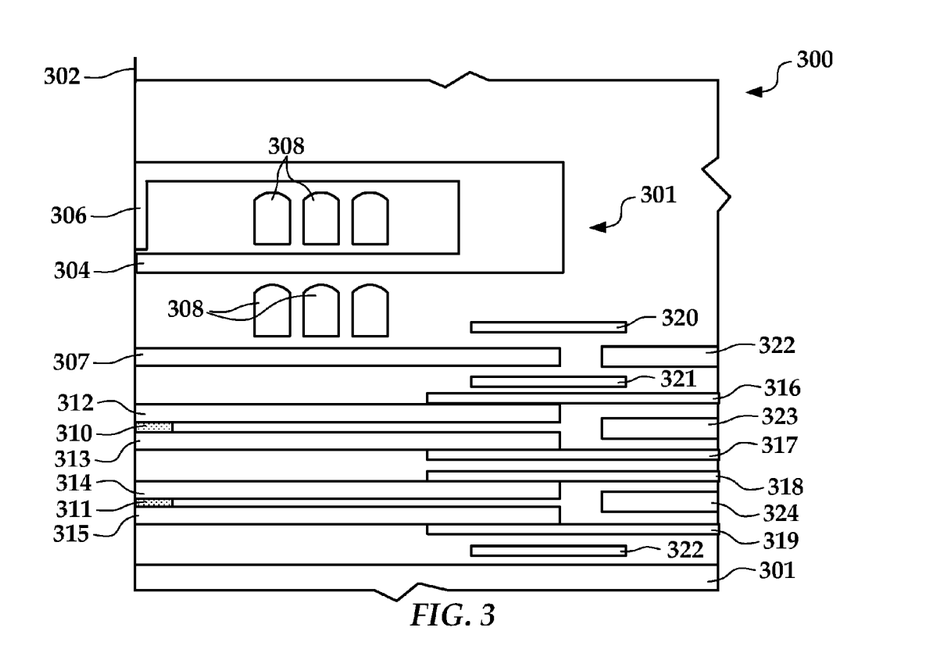
FIG. 3 is a cross-sectional view of a read/write head according to an example embodiment.
Figure 4:
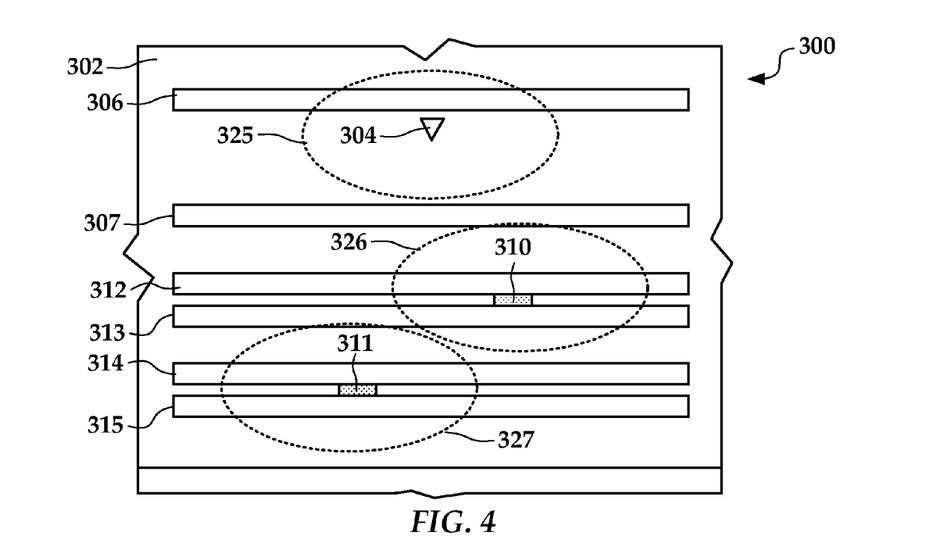
FIG. 4 is a media-facing-surface view of the read/write head of FIG. 3.

In FIG. 3, a block diagram shows a cross section of a read/write head 300 according to an example embodiment. In FIG. 4, a block diagram shows the read/write head 300 as viewed from the media facing surface 302. A write transducer 301 includes a write pole 304, upper return pole 306, lower return pole 307, and coil turns 308. Below the write transducer 301 are two read transducers 310, 311. Each read transducer 310, 311 may include a magnetoresistive stack, and are surrounded by respective top and bottom shields 312-315. Electrical contacts 316-319 provide electrical connections between the shields 312-316 and an external device, e.g., for coupling the read transducers 310, 311 to a preamplifier.

As seen in FIG. 4, the read transducers 310, 311 are offset from each other in a both a cross-track direction (left-to-right in FIG. 4) and a down-track direction (top-to-bottom in FIGS. 3 and 4). The cross-track offset facilitates reading two tracks at the same time, or overlapping parts thereof. The read transducers 310, 311 are shown here with no cross-track overlap, although other embodiments may include such an overlap (see, e.g., FIG. 1). Generally, the down-track offset facilitates, among other things, electrical isolation between the read transducers 310, 311.

The illustrated read/write head 300 further includes heaters 320-322, as seen in FIG. 3. The heaters 320-322 are thin-film components that produce heat in response to an applied current, e.g., due to a resistance of the heaters 320-322. Heater 320 may be used to control protrusion of write pole 304. Heaters 321 and 322 are used to independently control the protrusions of the read transducers 310, 311. The writer heater 320 may be tied to (e.g., work dependently with) one of the reader heaters 321, 322, or may be operable to control protrusion of the write pole 304 independently of the reader heaters 321, 322.

The read/write head 300 may include features that assist in providing the desired protrusion profile for any of the read transducers 310, 311 and the write pole 304. An example of such a feature is shown as push block 322 located behind the lower return pole 307. Generally, the push block 322 includes a layer of material with a coefficient of thermal expansion that is higher than that of the surrounding material (e.g., dielectric material) of the read/write head 300. By regulating the size, location, and material of the push block 322, a desired protrusion response may be obtained at the media-facing surface for any of the read transducers 310, 311 or write transducer 301.

Additional push blocks 323, 324 may be included for each of the read transducers 310, 311. The push blocks 323, 324 may be located with a cross-track offset from each other to correspond with the different cross-track locations of the read transducers 310, 311. The reader heaters 321, 322 may be similarly offset in a cross-track direction. As such, each of the read transducers 310, 311 and write pole 304 may have separately controllable protrusion regions 325-327 as generally indicated in FIG. 4.

Figure 5:
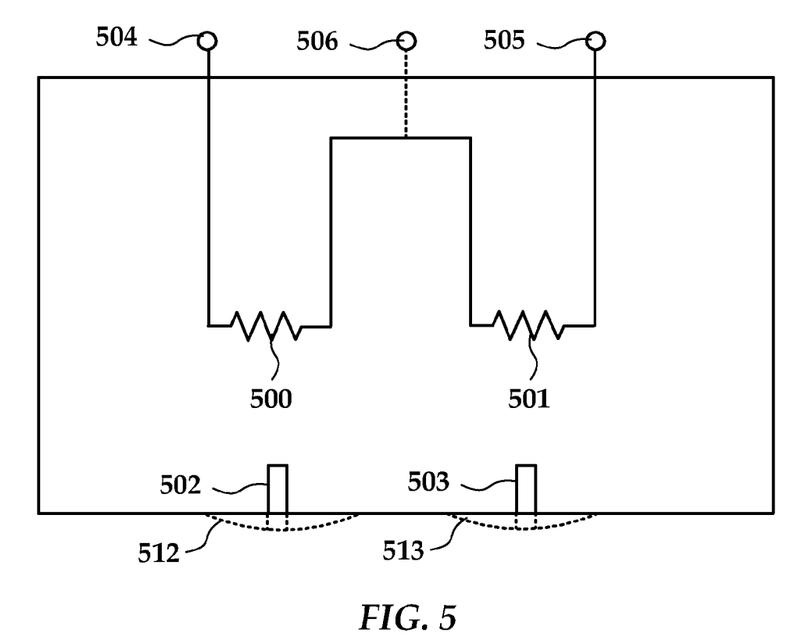
FIG. 5 is a schematic diagram showing an arrangement of protrusion heaters according to an example embodiment.

In FIG. 5, a schematic diagram shows an arrangement of protrusion heaters 500, 501 according to an example embodiment. The protrusion heaters 500, 501 control protrusion regions 512, 513 of respective read transducers 502, 503. The heaters 500, 501 are coupled to a controller (not shown) via at least two control lines 504, 505, and optionally by a third, common control line 506. Generally, if control line 506 is eliminated, the heaters 500, 501 are configured in series, such that the same current will flow through each heater 500, 501. If control line 506 is used, the heaters 500, 501 may be run in parallel, such that a different current flows through each heater 500, 501.

Figure 6:
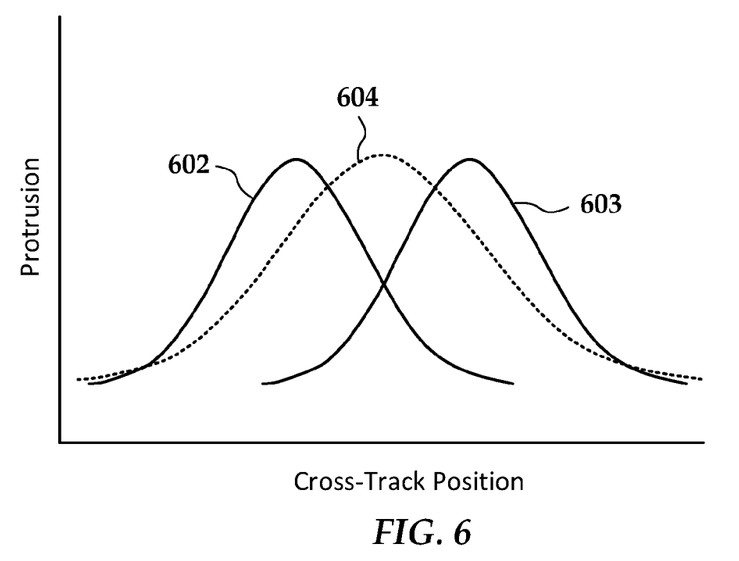
FIG. 6 is a graph of protrusions curves associated with read transducers according to example embodiments.

Generally, it is desired to independently control protrusion regions 512, 513 during device operation to optimize performance of the read transducers 502, 503. As shown in the graph of FIG. 6, the example protrusions curves 602, 603 associated with the read transducers 502, 503 are offset from one another in a cross-track direction. By using separately controllable protrusion regions 602, 603, the control response can be maximized by centering the peak protrusion of each region 602, 603 over each read transducer 502, 503. This is opposed to a centrally located heater, which may produce a response such as shown by protrusion region 604. It should be noted that if a separate writer heater is used for a single write transducer, the writer heater may be centrally located and may produce a protrusion similar to region 604. In another case, two or more reader heaters could be used simultaneously to produce the protrusion region 604.

In reference again to FIG. 5, independent control of protrusion regions 512, 513 during device operation can be accomplished in one example by utilizing a parallel connection for heaters 500, 501. For example, common control line 506 can be tied to ground (or some other fixed potential) and current though heaters 500, 501 can be independently varied by changing voltages applied at control lines 504, 505. While parallel current paths may be relatively simple to implement at a controller, the addition of a third control line 506 may be less easy to implement at the slider. The number of control lines coupled to the slider may be limited for reasons such as limited room for bonding pads, difficulty of manufacture, signal interference, reliability, etc.

Connecting heaters 500, 501 in series minimizes the connections needed at the slider, although the series connection may cause the same current to flow through both heaters 500, 501. Even so, it may still be possible to independently control the protrusion regions using only two control lines 504, 505 for the two heaters 500, 501. For example a separately controlled write heater may be included in the slider, and the write heater may be closer to one of the heaters 500, 501 than to the other. In such a case, the write heater may also be used to adjust clearance for one of the read heaters. An example of this use of a write heater may be demonstrated by referring back to FIG. 4.

In FIG. 4, if the protrusion region 325 of the writer heater overlaps the protrusion region 326 of the proximate reader 310 but does not overlap the other reader protrusion region 327, then the writer heater 320 (see FIG. 3) could be activated during reads for purposes of controlling protrusion region 326. In such a case, the protrusion 326 of the read transducer 310 would be due to the current flowing through its associated heater 321 (see FIG. 3) plus protrusion 325 induced by write heater 320. The protrusion 327 of read transducer 311 would also be due to the current flowing through its associated heater 322 (which is the same current flowing through heater 321), but it would not be significantly affected by write-heater-induced protrusion 325.

Figure 7:
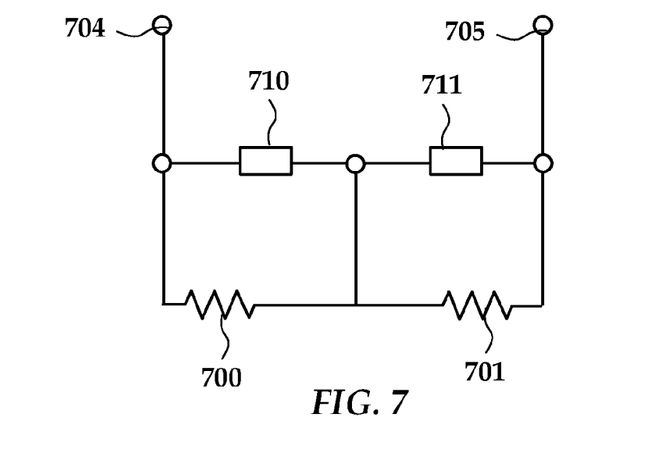
FIG. 7 is a schematic diagram illustrating independently controllable, series-connected heaters according to an embodiment.

Another example of how series connected heaters can be independently controlled according to an embodiment is shown in the schematic diagram of FIG. 7. Heaters 700, 701 are series connected to each other and coupled to a control circuit via control lines 704, 705. Shunts 710, 711 are placed in series with respective heaters 700, 701. The shunts 710, 711 may be frequency and/or polarity dependent, and may include active components (e.g., diodes) and/or passive components (e.g., capacitors, inductors), Either one or both shunts 710, 711 may be used, and one of ordinary skill in the art can readily adapt the embodiments described below for use with a single shunt device.

In one example, the shunts 710, 711 may be frequency dependent such that the amount of alternating current (AC) that passes through the shunts 710, 711 varies depending on frequency of an applied AC signal. Each shunt 710, 711 can be configured with a different frequency response, such that current flowing through each of the heaters 700, 701 is frequency dependent. As such, relative power output by heaters 700, 701 can be varied by varying the frequency of an AC signal applied to control lines 704, 705. This is further illustrated in the graph of FIG. 8, which shows relative power of heaters 700, 701 based on frequency of an applied AC signal.

Figure 8:
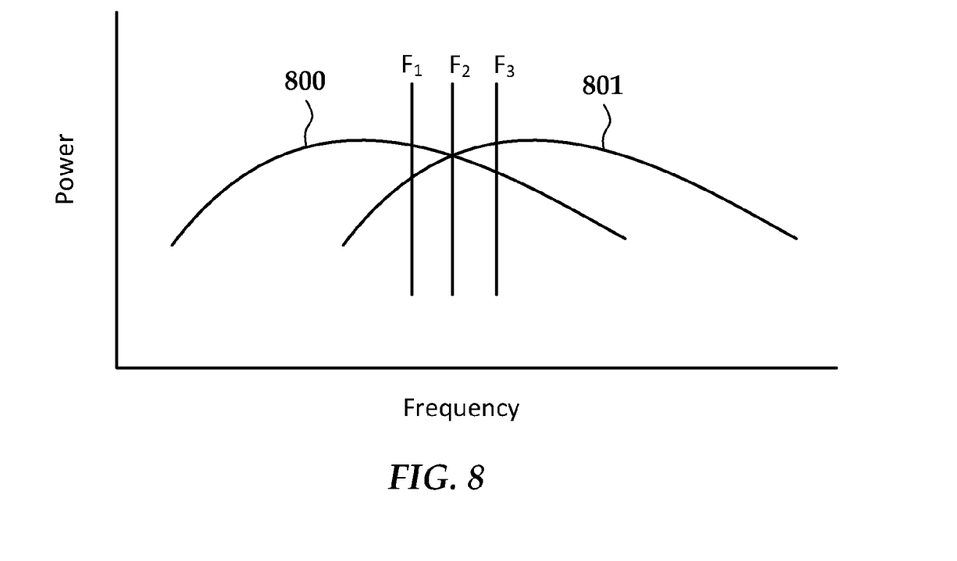
FIG. 8 is a graph of heater power in response to frequency of an applied signal according to an example embodiment.

Curve 800 represent power output by heater 700 and curve 801 represents the power output by heater 701. Generally, these curves 800, 801 represent thermal power ($I^2R$) dissipated by resistive elements, and the current I flowing through the heaters 700, 701 is frequency dependent due to the shunts 710, 711. At frequency $F_1$, heater 700 outputs more power than heater 701, and vice versa at frequency $F_3$. At frequency $F_2$, both heaters 700, 701 output the same power. As such, the shunts 710, 711 facilitate independently controlling protrusion of transducer regions for series connected heaters by varying an AC signal applied to control lines 704, 705.

In another example, the shunts 710, 711 may be polarity dependent (e.g., acting as diodes), such that they pass current in one direction of current flow but not the opposite direction. If the shunts 710, 711 are arranged such that they block current in opposite directions, one of the shunts 710, 711 will act as an open circuit during a positive part of an applied AC signal and the other will act as a short circuit. The heater 700, 701 that is parallel with the open circuit will pass nearly all the current, and the other heater will pass little or no current. The current paths will be reversed in the negative part of the AC signal. In such a case, the relative power dissipated by the heaters 700, 701 can be controlled by varying an asymmetry of the AC signal around some reference point, e.g., 0 V. An example of the use of an asymmetric signal according to an example embodiment is shown in the graph of FIG. 9.

Figure 9:
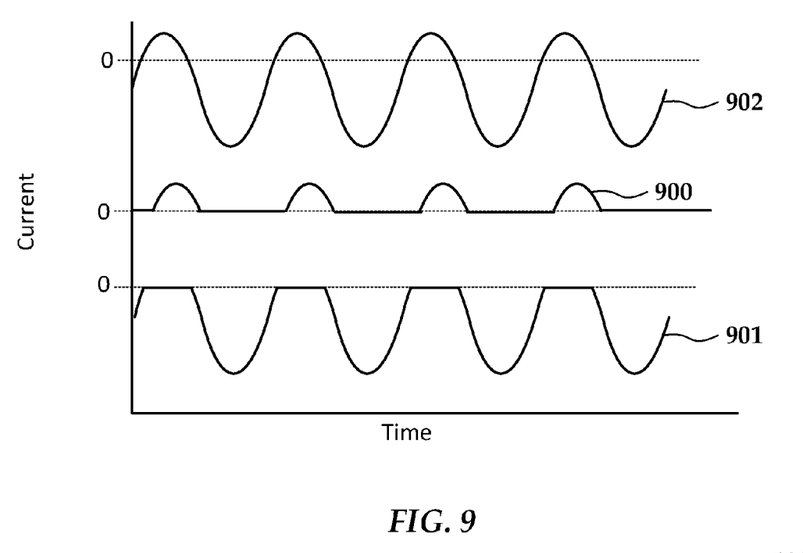
FIG. 9 is a graph of heater power in response to offset of an applied alternating current signal according to an example embodiment.

In FIG. 9, signal 902 represents a current waveform applied to series heaters, e.g., current driven through control lines 704, 705 shown in FIG. 7. Signal 902 is offset in a negative direction relative to 0 V, e.g., using a negative direct current (DC) offset. In this example, signal 900 represents current passing through heater 700 in FIG. 7, where the shunt 710 is an open circuit during positive current flow of signal 902, and shunt 711 is a closed circuit during positive current flow of signal 902. Signal 901 represents current passing through heater 701 under the same conditions. As should be apparent from curves 900, 901, the net amount of current passing through heater 700 is less than that through heater 701. This difference can be reduced or reversed by shifting the asymmetry of signal 902 in a positive direction.

It will be understood that the shunts 710, 711 shown in FIG. 7 can be used for static tuning of the current flow through heaters 700, 701. For example, the shunts 710, 711 may be configured as resistors that are not frequency or polarity dependent. At least part of the shunts may be located on a region that is easily accessible after manufacture of the slider, e.g., a side surface. During initial testing of the slider (e.g., before attachment to a gimbal assembly) the heater response may be tested, and one or more of the shunts 710, 711 adjusted (e.g., via laser trimming, abrasion) to equalize a response of the heaters 700, 701. Such adjustment may also be performed for shunts 710, 711 that are frequency and/or polarity dependent as described above.

Figure 10:
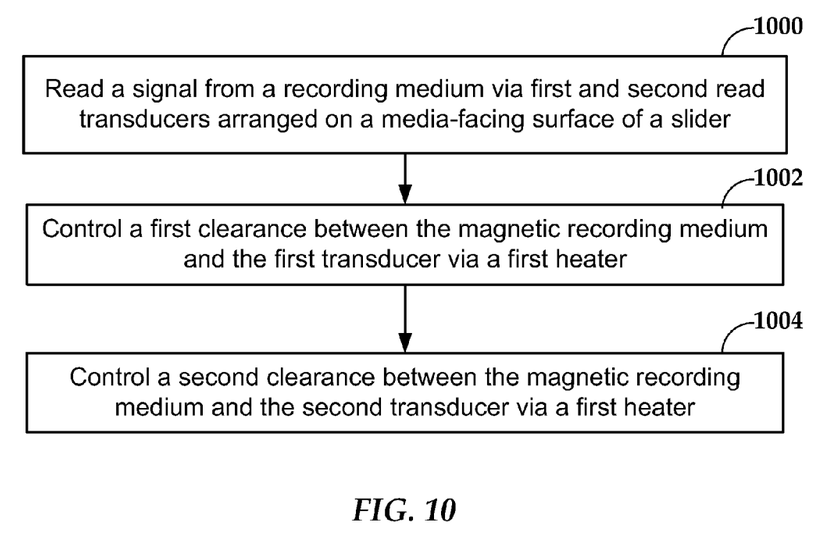
FIG. 10 is a flowchart illustrating a method according to an example embodiment.

In reference now to FIG. 10, a flowchart illustrates a method according to an example embodiment. The method involves reading 1000 a signal from a recording medium via first and second read transducers arranged on a media-facing surface of a slider. The read transducers may be offset from each other in a down-track and/or cross-track direction. A first clearance between the magnetic recording medium and the first transducer is controlled 1002 via a first heater. Independently of the first clearance, a second clearance is controlled 1004 between the magnetic recording medium and the second transducer via a second heater.

It will be understood that the concepts described hereinabove may be applied to any number of read transducers, e.g., more than two. The concepts may be similarly applicable to recording systems using multiple writers. For example a slider may include two or more write poles separated from one another in a cross-track and/or down-track direction, and multiple writer heaters may be used to independently adjust clearances of the multiple writer poles.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus comprising:
    first and second read transducers arranged on a media-facing surface and offset along a down-track direction and a cross-track direction from one another along the media-facing surface, the read transducers detecting magnetic fields of a recording medium; and
    first and second heaters disposed proximate the respective first and second read transducers, the first and second heaters offset from one another in the down-track direction and the cross-track direction, the first and second heaters independently controlling respective first and second protrusions of the first and second read transducers from the media-facing surface while the first and second readers are reading separate tracks of the recording medium.

2. The apparatus of claim 1, wherein the first and second heaters are connected in parallel to a controller that provides respective first and second currents to the first and second heaters.

3. The apparatus of claim 1, wherein the first and second heaters are connected in series, the apparatus further comprising at least one shunt across a selected one of the first and second heaters, the at least one shunt reducing a current flowing through the selected heater.

4. The apparatus of claim 1, further comprising a push block comprising a material of high coefficient of expansion behind at least one of the first and second read transducers and increasing a protrusion of the at least one transducer, the push block separate from the first and second heaters.

5. The apparatus of claim 1, further comprising at least one thermal sensor that detects first and second clearances between the first and second read transducers and the recording medium while the first and second readers are reading the separate tracks, the first and second heaters being independently controlled in response to the detection of the first and second clearances.

6. A system comprising:
    a slider comprising:
        first and second read transducers arranged on a media-facing surface of the slider and offset along a down-track direction and a cross-track direction from one another along the media-facing surface, the read transducers detecting magnetic fields of a recording medium; and
        first and second heaters disposed proximate the respective first and second read transducers and offset from one another in the down-track direction and the cross-track direction; and
    a control circuit coupled to the first and second heaters, the control circuit providing a current to the first and second heaters that independently controls respective first and second clearances between the first and second read transducers and the recording medium while the first and second readers are reading separate tracks of the recording medium at the same time.

7. The system of claim 6, wherein the first and second heaters are connected in parallel to the control circuit.

8. The system of claim 6, wherein the first and second heaters are connected in series, the slider further comprising at least one shunt across a selected one of the first and second heaters, the at least one shunt reducing the current flowing through the selected heater.

9. The system of claim 6, further comprising a push block comprising a material of high coefficient of expansion behind at least one of the first and second read transducers, the push block separate from the first and second heaters.

10. The system of claim 6, wherein the slider further comprises at least one thermal sensor coupled to the control circuit that detects first and second clearances between the first and second read transducers and the recording medium while the first and second readers are reading the separate tracks, the control circuit further configured to independently control the current to the first and second heaters in response to the detection of the first and second clearances.

11. A method comprising:
    reading first and second tracks of a magnetic recording medium via first and second read transducers arranged on a media-facing surface of a slider, wherein the first and second read transducers are offset along a down-track direction and a cross-track direction from one another along the media-facing surface; and
    while reading the first and second tracks:
        controlling a first clearance between the magnetic recording medium and the first read transducer via a first heater; and
        controlling, independently of the first clearance, a second clearance between the magnetic recording medium and the second read transducer via a second heater, wherein the first and second heaters are offset in the down-track direction and the cross-track direction from one another along the media-facing surface.

12. The method of claim 11, wherein the first and second heaters are connected in parallel to a controller, and wherein controlling the first and second clearances comprises sending independent first and second currents to the first and second heaters.

13. The method of claim 11, wherein the first and second heaters are connected in series, and wherein at least one shunt is coupled across a selected one of the first and second heaters, the at least one shunt reducing a current flowing through the selected heater, the method further comprising modifying the at least one shunt to modify the current.

14. The method of claim 11, further comprising adding a push block comprising a material of high coefficient of expansion behind at least one of the first and second read transducers to increase protrusion of the at least one transducer, the push block separate from the first and second heaters.

15. The method of claim 11, further comprising detecting the first and second clearances while reading the first and second tracks via at least one thermal sensor, the first and second heaters being independently controlled in response to the detection of the first and second clearances.

16. An apparatus comprising:
first and second read transducers arranged on a media-facing surface and offset from one another in a cross-track direction and a down-track direction along the media-facing surface, the read transducers detecting magnetic fields of a recording medium;
first and second heaters disposed proximate the respective first and second read transducers and offset from one another in the cross-track direction and the down-track direction, the first and second heaters independently controlling respective first and second protrusions of the first and second read transducers from the media-facing surface;
at least one thermal sensor; and
a control circuit coupled to the first and second heaters and the at least one thermal sensor, the control circuit detecting first and second clearances between the first and second read transducers and the recording medium via the at least one thermal sensor and, in response thereto, providing a current to the first and second heaters that independently controls the first and second clearances while the first and second readers are reading separate tracks of the recording medium.

17. An apparatus comprising:
first and second read transducers arranged on a media-facing surface, the read transducers detecting magnetic fields of a recording medium; and
first and second heaters disposed proximate the respective first and second read transducers, the first and second heaters independently controlling respective first and second protrusions of the first and second read transducers from the media-facing surface, wherein the first and second heaters are connected in series, and wherein at least one shunt across a selected one of the first and second heater reduces a current flowing through the selected heater.

\* \* \* \* \*